United States Patent
Lin et al.

(10) Patent No.: US 10,434,539 B2
(45) Date of Patent: Oct. 8, 2019

(54) BAKING-TYPE AQUEOUS ORGANIC SILICON FLUORINE-CONTAINING POLYMER PAINT, COATING, AND METHOD FOR MANUFACTURING THE SAME

(71) Applicant: GRAND TEK ADVANCE MATERIAL SCIENCE CO., LTD., Taipei (TW)

(72) Inventors: Hsueh-Tso Lin, Hsinchu (TW); Rui-Gang Hou, Taipei (TW); Dick Zhong, Arcadia, CA (US)

(73) Assignee: GRAND TEK ADVANCE MATERIAL SCIENCE CO., LTD., Taipei (TW)

( * ) Notice: Subject to any disclaimer, the term of this patent is extended or adjusted under 35 U.S.C. 154(b) by 392 days.

(21) Appl. No.: 15/091,097

(22) Filed: Apr. 5, 2016

(65) Prior Publication Data
US 2017/0232470 A1 Aug. 17, 2017

(30) Foreign Application Priority Data
Feb. 16, 2016 (TW) .............................. 105104429 A

(51) Int. Cl.
*B05D 3/02* (2006.01)
*B05D 7/00* (2006.01)
*C09D 5/16* (2006.01)
*C09D 127/16* (2006.01)

(52) U.S. Cl.
CPC ............. *B05D 3/0254* (2013.01); *B05D 7/50* (2013.01); *C09D 5/1668* (2013.01); *C09D 5/1693* (2013.01); *C09D 127/16* (2013.01)

(58) Field of Classification Search
CPC ...... B05D 3/0254; B05D 7/50; C09D 5/1693; C09D 5/1668; C09D 127/16
USPC ....................................................... 428/216
See application file for complete search history.

(56) References Cited

U.S. PATENT DOCUMENTS

| | | | | |
|---|---|---|---|---|
| 4,786,546 A | * | 11/1988 | Vassiliou | B05D 7/16 427/216 |
| 6,362,271 B1 | * | 3/2002 | Lin | C09D 127/16 523/346 |
| 2007/0092738 A1 | * | 4/2007 | Gronlund Scholten | C09D 5/002 428/448 |
| 2011/0290147 A1 | * | 12/2011 | Coppens | C04B 41/009 106/2 |
| 2012/0220712 A1 | * | 8/2012 | Saito | C09D 127/12 524/544 |
| 2013/0059961 A1 | * | 3/2013 | Arcella | B82Y 30/00 524/263 |
| 2013/0149524 A1 | * | 6/2013 | Lin | C04B 35/14 428/323 |
| 2014/0005298 A1 | * | 1/2014 | Thewes | C09D 5/185 523/179 |
| 2014/0220345 A1 | * | 8/2014 | Lin | C09D 5/031 428/402 |
| 2016/0376459 A1 | * | 12/2016 | Lin | C08L 27/16 524/506 |

FOREIGN PATENT DOCUMENTS

| | | | |
|---|---|---|---|
| CN | 101210059 A | | 7/2008 |
| CN | 102712708 A | | 10/2012 |
| TW | 201538589 A | * | 10/2015 |
| TW | 201538589 A | | 10/2015 |

OTHER PUBLICATIONS

Office Action dated Aug. 3, 2016 in corresponding TW patent Application No. 105104429 (8 pages).
Office Action dated Mar. 11, 2019 in CN Application No. 201610194982.1. (11 pages).

* cited by examiner

*Primary Examiner* — Tahseen Khan
(74) *Attorney, Agent, or Firm* — Muncy, Geissler, Olds & Lowe, P.C.

(57) ABSTRACT

A baking-type aqueous organic silicon fluorine-containing polymer paint is provided, which includes an aqueous organic silicon fluorine-containing polymer dispersion and a curing agent. The curing agent includes aqueous amino resin, aqueous isocyanate resin, or a combination thereof. In addition, the paint may further include an assist resin such as aqueous polyester resin, aqueous acrylic acid resin, aqueous epoxy resin, aqueous phenoxy resin, or a combination thereof.

9 Claims, No Drawings

BAKING-TYPE AQUEOUS ORGANIC SILICON FLUORINE-CONTAINING POLYMER PAINT, COATING, AND METHOD FOR MANUFACTURING THE SAME

CROSS REFERENCE TO RELATED APPLICATIONS

This application claims priority of Taiwan Patent Application No. 105104429, filed on Feb. 16, 2016, the entirety of which is incorporated by reference herein.

BACKGROUND

Technical Field

The disclosure relates to an organic silicon fluorine-containing polymer coating and paint, and in particular it relates to a baking-type aqueous organic silicon fluorine-containing polymer coating and paint.

Description of the Related Art

Poly(vinylidene difluoride) (PVDF) resin coating has extraordinary climate resistance, anti-fouling properties, chemical resistance, and the like. The baking-type PVDF coating is used widely, and has become a requirement in marketing such products as curtain walls, machines, and architectural materials. The conventional baking-type PVDF paint is usually dispersed in an organic solvent, which violates environmentally friendly manufacturing practices. As such, the solvent-based PVDF paint should be replaced with an aqueous baking-type and high climate-resistant paint to adapt to market requirements.

BRIEF SUMMARY

One embodiment of the disclosure provides a baking-type aqueous organic silicon fluorine-containing polymer paint, comprising an aqueous organic silicon fluorine-containing polymer dispersion and a curing agent. The curing agent includes an aqueous amino resin, an aqueous isocyanate resin, or a combination thereof.

One embodiment of the disclosure provides a baking-type aqueous organic silicon fluorine-containing polymer coating, comprising a primer coating and a finish coating on the primer coating. The primer coating includes a reaction product of a first aqueous organic silicon fluorine-containing polymer dispersion, a first curing agent, and an assist resin. The first curing agent includes an aqueous amino resin, an aqueous isocyanate resin, or a combination thereof. The assist resin includes an aqueous polyester resin, an aqueous acrylic acid resin, an aqueous epoxy resin, an aqueous phenoxy resin, or a combination thereof. The first aqueous organic silicon fluorine-containing polymer dispersion and the first curing agent have a weight ratio of 100:6 to 100:10, and the first aqueous organic silicon fluorine-containing polymer dispersion and the assist resin have a weight ratio of 100:30 to 100:40. The finish coating includes a reaction product of a second aqueous organic silicon fluorine-containing polymer dispersion and a second curing agent. The second curing agent includes an aqueous amino resin, an aqueous isocyanate resin, or a combination thereof. The second aqueous organic silicon fluorine-containing polymer dispersion and the second curing agent have a weight ratio of 100:4 to 100:6.

One embodiment of the disclosure provides a method of forming a baking-type aqueous organic silicon fluorine-containing polymer coating, comprising coating a first paint on a substrate and then baking and drying the first paint to form a primer coating; and coating a second paint on the primer coating and then baking and drying the second paint to form a finish coating. The first coating includes a first aqueous organic silicon fluorine-containing polymer dispersion; a first curing agent including an aqueous amino resin, an aqueous isocyanate resin, or a combination thereof; and an assist resin including an aqueous polyester resin, an aqueous acrylic acid resin, an aqueous epoxy resin, an aqueous phenoxy resin, or a combination thereof. The first aqueous organic silicon fluorine-containing polymer dispersion and the first curing agent have a weight ratio of 100:6 to 100:10, and the first aqueous organic silicon fluorine-containing polymer dispersion and the assist resin have a weight ratio of 100:30 to 100:40. The second paint includes a second aqueous organic silicon fluorine-containing polymer dispersion; and a second curing agent including an aqueous amino resin, an aqueous isocyanate resin, or a combination thereof. The second aqueous organic silicon fluorine-containing polymer dispersion and the second curing agent have a weight ratio of 100:4 to 100:6.

One embodiment of the disclosure provides a method of forming a baking-type aqueous organic silicon fluorine-containing polymer coating, comprising: coating a first paint on a substrate; coating a second paint on the first paint; and baking and drying the first and second paints to form a primer coating and a finish coating. The first coating includes a first aqueous organic silicon fluorine-containing polymer dispersion; a first curing agent including an aqueous amino resin, an aqueous isocyanate resin, or a combination thereof; and an assist resin including an aqueous polyester resin, an aqueous acrylic acid resin, or a combination thereof. The first aqueous organic silicon fluorine-containing polymer dispersion and the first curing agent have a weight ratio of 100:6 to 100:10, and the first aqueous organic silicon fluorine-containing polymer dispersion and the assist resin have a weight ratio of 100:30 to 100:40. The second paint includes a second aqueous organic silicon fluorine-containing polymer dispersion; and a second curing agent including an aqueous amino resin, an aqueous isocyanate resin, or a combination thereof. The second aqueous organic silicon fluorine-containing polymer dispersion and the second curing agent have a weight ratio of 100:4 to 100:6.

A detailed description is given in the following embodiments.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

One embodiment of the disclosure provides a baking-type aqueous organic silicon fluorine-containing polymer paint, which includes an aqueous organic silicon fluorine-containing polymer dispersion and a curing agent. The aqueous organic silicon fluorine-containing polymer dispersion and the curing agent have a weight ratio of 100:4 to 100:6. The paint can be applied to form a finish coating of a bi-layered coating. An overly low ratio of curing agent may reduce the solvent resistance of the coating. An overly high ratio of curing agent may degrade the toughness and the impact resistance of the coating. The curing agent can be an aqueous amino resin, an aqueous isocyanate resin, or a combination thereof. The aqueous amino resin can be fully methylated melamine formaldehyde resin (e.g. CYMEL 303LF commercially available from Allnex or MR-603 LF commercially available from Chang Chun Chemical Ltd.), partially methylated melamine formaldehyde resin (e.g. ETERMINO 9603-80 commercially available from Eternal Materials Co., Ltd.), high —NH type melamine formaldehyde resin (e.g. M-40WT or M-50WT commercially available from Chang Chun Chemical Ltd.), mixed etherified melamine formaldehyde resin such as methylated and n-butylated mixed etherified melamine formaldehyde resin (e.g. MR-2130 commercially available from Chang Chun Chemical Ltd., wherein the methylated etherified resin and the n-butyl etherified resin have a ratio of 3:1, or MR-2131 commercially available from Chang Chun Chemical Ltd., wherein the methylated etherified resin and the n-butyl etherified resin have a ratio of 2:1) or methylated and i-butylated mixed etherified melamine formaldehyde resin (e.g. MR-2161 commercially available from Chang Chun Chemical Ltd., wherein the methylated etherified resin and the i-butyl etherified resin have a ratio of 3:1), or aqueous and highly alkyl etherified benzoguanamine resin (CYMEL 1123 or MYCOAT 137 commercially available from Allnex or a combination thereof). In one embodiment, the aqueous amino resin is fully methylated melamine formaldehyde resin, aqueous and highly alkyl etherified benzoguanamine resin, or a combination thereof. The aqueous isocyanate resin can be blocked aqueous isocyanate resin or non-blocked aqueous isocyanate resin. In one embodiment, the blocked aqueous isocyanate resin is selected. The aqueous isocyanate resin can be climate resistant and non-yellowing aqueous isocyanate resin such as Rhodocat WT-1000 commercially available from Perstorp Company or BI 200, BI 201, or BI 220 commercially available from Baxenden Chemical.

In one embodiment, the aqueous organic silicon fluoro-containing polymer dispersion includes 100 parts by weight of poly(vinylidene difluoride-hexafluoropropylene) (P(VDF-HFP)). Compared to the homopolymer of vinylidene difluoride (PVDF), the P(VDF-HFP) has a lower crystallinity, a lower glass transition temperature (Tg), and a higher solvent swelling ratio. In one embodiment, the poly(VDF-HFP) has a HFP content of 20 wt % to 50 wt %. An overly high ratio of the HFP content may overly soften the product film. An overly low ratio of the HFP content may negatively influence the stability of the reaction system.

The aqueous organic silicon fluoro-containing polymer dispersion also includes 10 to 30 parts by weight of an organic silicon emulsion. An overly high ratio of the organic silicon emulsion easily forms gelling particles during the reaction. The dispersion cannot achieve the desired properties due to an overly low ratio of organic emulsion. In one embodiment, the organic silicon emulsion is methylphenyl organic silicon resin emulsion, which simultaneously has methyl siloxy bondings and phenyl siloxy bondings. Compared to methyl organic silicon resin, the methylphenyl organic silicon resin is obviously better in terms of thermal flexibility, mechanical properties, adhesion, and brightness due to the phenyl siloxy bondings. The organic silicon emulsion may improve brightness, acid resistance, and crack resistance of the dispersion.

The aqueous organic silicon fluoro-containing polymer dispersion also includes acrylate polymer, and the acrylate polymer and the sum of the poly(vinylidene difluoride-hexafluoropropylene) and the organic silicon emulsion have a weight ratio of 30:100 to 50:100. An overly low ratio of the acrylate polymer easily breaks the emulsion due to an unstable reaction, and the reaction result is easily separated into layers. An overly high ratio of the acrylate polymer may negatively influence the climate resistance and the washability of the aqueous organic silicon fluoro-containing polymer dispersion. A monomer of the acrylate polymer can be a suitable acrylic acid, methacrylic acid, or another polymerizable monomer. The monomer includes but is not limited to methyl methacrylate (MMA) and ethyl acrylate (EA), butyl acrylate (BA), butyl methacrylate (BMA), 2-ethylhexyl acrylate (2-ERA), hydroxypropyl acrylate (HPA), hydroxyethyl acrylate (HEA), hydroxyethyl methacrylate (HEMA), or a combination thereof. In one embodiment, the monomer is a mixture of MMA, EA, and HEMA.

In one embodiment, the monomer of the acrylate polymer may further include 1 to 10 parts by weight of a functional monomer, which includes but is not limited to methacrylic acid (MAA), N-(hydroxymethyl)acrylamide (NMA), acrylic acid (AA), acrylamide (AM), glycidyl methacrylate (GMA), organic silicon functional monomer such as vinyl trimethoxy silane, methyl vinyl dimethoxy silane, vinyl triethoxy silane, (3-methacryloxy)propyl triethoxy silane, (methacryloxymethyl)methyl dimethoxy silane, methacryloxymethyl trimethoxy silane, diacetoneacrylamide (DAAM), isobornyl acrylate (IBOA), or a combination thereof. The functional monomer may enhance the adhesion between the dispersion and a substrate, increase the crosslinking density of the resin during film formation, and increase the water resistance, brightness, hardness, and toughness of the resin. The reaction is easily gelled to form a resin being easily brittle with poor water resistance and low climate resistance due to an overly high ratio of the functional monomer.

In one embodiment, the aqueous organic silicon fluoro-containing polymer dispersion can be manufactured as follows: (1) evenly mixing 100 parts by weight of the P(VDF-HFP), 10 to 30 parts by weight of the organic silicon emulsion, 0.3 to 0.9 parts by weight of an emulsifier, and 0.02 to 0.12 parts by weight of a pH buffer in a reactor. In one embodiment, the emulsifier can be anionic emulsifier, non-ionic emulsifier, reactive emulsifier, composite emulsifier, or a combination thereof. The anionic emulsifier can be sodium lauryl sulfonate (SLS). The composite emulsifier can be alkylphenol ether sulfosuccinate sodium salt such as emulsifier MS-1. The non-ionic emulsifier can be polyoxyethylene laurylether. The reactive emulsifier can be sodium 3-allyloxy-2-hydroxy-1-propanesulfonate such as commercially available COPS-1. An overly high amount of emulsifier in this step may cause an overly high polymerization rate (e.g. gelling), produce too many bubbles in the reaction to stabilize the emulsion, and obviously lower the physical and chemical resistance (e.g. water resistance) of the polymer film. An overly low amount of emulsifier may cause the emulsion have a poor stability, and cause the polymerization be easily gelled (such as hanging rubber, holding a shaft, and the like). In one embodiment, the pH buffer can be phosphate salt, carbonate salt, or a combination thereof. An overly high amount of pH buffer in this step may lower the reactivity of the acrylate monomer and the functional monomer, thereby reducing the physical and chemical properties (e.g. water resistance) of the polymer film. An overly low amount of pH buffer in this step cannot stabilize the reaction, causing the emulsion to be break easily during the reaction.

Subsequently, (2) adding 0.06 to 0.1 parts by weight of an initiator and 4 wt % to 7 wt % of an acrylate monomer into the reactor. In one embodiment, the initiator should be oil soluble and initiated at a low temperature. The water soluble initiator easily initiates the monomers in water phase, but has difficulty initiating the monomers that have swelled into the fluoro-containing and silicon-containing compounds so that an inter-penetrated network (IPN) or a semi-IPN of the polymer cannot be easily formed. Next, the fluoro-containing and silicon-containing compounds are very unstable at a high temperature, such as a temperature that is higher than 85° C., thereby easily breaking the emulsion to aggregate the solid in the emulsion. The initiator can be azobisisobutyronitrile (AIBN) or benzoyl peroxide (BPO). In one embodiment, the initiator is AIBN. An overly high amount of initiator results in an overly high reaction rate, thereby easily breaking the emulsion to gel. An overly low amount of initiator results in a low reaction rate. An overly high amount of acrylate monomer in this step may result in an unstable system, resulting in the dispersion being easily aggregated. An overly low amount of acrylate monomer cannot adequately dissolve the initiator. In one embodiment, further adding 1 to 10 parts by weight of the functional monomer into the reactor in step (2).

Subsequently, a pre-emulsion is prepared by (3) mixing 0.3 to 0.9 parts by weight of the emulsifier, 0.02 to 0.12 parts by weight of the pH buffer, 93 wt % to 96 wt % of the acrylate monomer, and water. In one embodiment, the acrylate monomer in steps (2) and (3) and the sum of the poly(vinylidene difluoride-hexafluoropropylene) and the organic silicon emulsion have a weight ratio of 30:100 to 50:100.

Subsequently, (4) 40 wt % to 50 wt % of the pre-emulsion is dropwisely added into the reactor at room temperature to be stirred and reacted with the mixture in the reactor, and the reaction is heated to 60° C. to 70° C. and maintained at 60° C. to 70° C. for 0.5 to 1 hour. An overly high amount of pre-emulsion in this step may result in an overly high monomer concentration in the initial stage of the reaction, causing the reaction rate to be too fast to gel the reaction, and breaking the emulsion. An overly low amount of pre-emulsion in this step may result in a slow reaction rate that will elongate the reaction period. An overly high temperature or an overly long period of being maintained at 60° C. to 70° C. may easily break the emulsion and gel the reaction due to an overly fast reaction rate, thereby negatively influencing the mechanical stability of the emulsion and reducing the active radicals. The continuation of the reaction in this step and a reaction in the following step will be negatively influenced due to the reduced active radicals. An overly low temperature or an overly short period of being maintained at 60° C. to 70° C. may leave too much monomer to negatively influence the reaction in the following step.

Subsequently, (5) the remaining pre-emulsion is dropwisely added into the reaction at 60° C. to 70° C. in 30 to 90 minutes. An overly short addition period of the pre-emulsion results in an overly high monomer concentration and an overly fast reaction rate, thereby easily breaking the emulsion and gelling the reaction. An overly long addition period of the pre-emulsion results in an overly slow reaction rate. Thereafter, the reaction is heated to 75° C. to 80° C. and maintained at 75° C. to 80° C. for 0.5 to 1 hour. An overly high temperature or an overly long period of being maintained at 75° C. to 80° C. in this step may make an unstable emulsion that can easily be broken. An overly low temperature or an overly short period of being maintained at 75° C. to 80° C. in this step may leave too many monomers, causing the reaction conversion rate to be low. Subsequently, the reaction is cooled to 60° C. to 70° C., 0.1 to 0.2 parts by weight of a terminator is added to the reactor, the temperature of the reactor is maintained for 1 to 2.5 hours, and the reaction is cooled to be filtered for collecting the filtrate, wherein the filtrate is the aqueous organic silicon fluoro-containing polymer dispersion. An overly high temperature or an overly long period of being maintained at 60° C. to 70° C. in this step may create an unstable emulsion that can become broken easily. An overly low temperature or an overly short period of being maintained at 60° C. to 70° C. in this step may leave too much monomer, causing the reaction conversion rate to be low. In one embodiment, the terminator can be a water soluble terminator such as potassium peroxydisulfate (KPS), ammonium peroxydisulfate (APS), an oxidation-reduction serial terminator composed of tert-butyl hydroperoxide (t-PBH) and sodium formaldehyde sulfoxylate (SFS), or APS/FeSO$_4$. In one embodiment, the terminator is the oxidation-reduction series terminator (t-PBH/SFS). An overly high amount of terminator makes an unstable emulsion that can be easily broken. An overly low amount of terminator may leave too much of the monomer, resulting in the reaction conversion rate being low.

In one embodiment, an assist resin such as aqueous polyester resin, an aqueous acrylic acid resin, an aqueous epoxy resin, an aqueous phenoxy resin, or a combination thereof can be further added into the above paint, and the curing agent amount is also increased to obtain another paint for being applied to form a primer coating in the bi-layered coating. In this paint, the aqueous organic silicon fluorine-containing polymer dispersion and the curing agent have a weight ratio of 100:6 to 100:10, and the aqueous organic silicon fluorine-containing polymer dispersion and the assist resin have a weight ratio of 100:30 to 100:40. An overly low ratio of curing agent may reduce the solvent resistance of the coating. An overly high ratio of curing agent may degrade the toughness and the impact resistance of the coating. An overly low ratio of assist resin will lower the adhesion between the coating and the substrate. An overly high ratio of assist resin will degrade the physical and chemical properties of the coating. Moreover, the finish coating is easily cracked due to different expansion coefficients of the primer coating and the finish coating if the assist resin ratio is overly high.

The aqueous acrylic acid resin includes water-soluble acrylic acid polyol resin, emulsion-type acrylic acid polyol resin, water-soluble styrene/acrylic acid copolymer polyol resin (e.g. ETERWAT 1611 commercially available from ETERNAL MATERIALS CO., LTD.), emulsion-type styrene/acrylic acid copolymer polyol resin, or a combination thereof. The aqueous polyester resin includes aqueous polyester polyol resin (e.g. WP-536 commercially available from ShangHai Winsure Company, 5050-B-75 commercially available Eternal Materials Co., Ltd., or Uradil SZ-250-M1-40 or Uradil SZ-251-G3Z-70 commercially available from DSM), emulsion-type polyester polyol resin (WP-850 commercially available from ShangHai Winsure Company), or aqueous acrylate modified polyester resin (e.g. Uradil SZ-260-G3-65 commercially available from DSM). The aqueous epoxy resin can be aqueous epoxy resin emulsion, aqueous bisphenol A epoxy resin (e.g. DER 915 commercially available from DOW CHEMICAL), or aqueous epoxy phenolic resin (e.g. DER 916 commercially available from DOW CHEMICAL). The aqueous phenoxy resin can be PKHW-34, PKHW-35, or PKHW-38 commercially available from U.S. InChem Company.

In one embodiment, the paint for being applied to form the primer coating and the finish coating may further include inorganic color powder, which includes but is not limited to a white powder of titanium oxide, pearl powder, or zinc sulfide, a black powder of cobalt-copper-manganese oxide, copper-manganese oxide, copper-manganese-iron oxide, manganese-iron oxide, or iron oxide, a yellow powder of titanium yellow or bismuth yellow, a green powder of cobalt green or chromium oxide, or a blue powder of cobalt-chromium-aluminum oxide or ultramarine. The color powder can be used individually or in a combination to achieve the desired color.

In one embodiment, the paints for the primer coating and the finish coating may further include auxiliary agent. The auxiliary agent is not specifically limited, which should not negatively influence the function of the coating. In one embodiment, the auxiliary agent can be thickening agent, coalescent agent, dispersing agent, wetting agent, anti-foaming agent, anti-corrosion agent, or the like.

In one embodiment, the paint for the primer coating is prepared by following steps. First, the curing agent, the assist resin, the color powder (optional), the auxiliary agent (optional), and water are evenly mixed. The mixture is ground for 2 hours to have a particle size less than 10 μm, and then evenly mixed with the aqueous organic silicon fluoro-containing polymer dispersion and the auxiliary agent (optional).

In one embodiment, the paint for the finish coating is prepared by following steps. First, the curing agent, the auxiliary agent (optional), and water are evenly mixed. The mixture is ground for 2 hours to have a particle size less than 10 μm, and then evenly mixed with the aqueous organic silicon fluoro-containing polymer dispersion and the auxiliary agent (optional).

One embodiment of the disclosure also provides a method for preparing a baking-type aqueous organic silicon fluorine-containing polymer coating. First, the paint for the primer coating is coated on a substrate (e.g. chromium-treated metal plate). After the surface of the paint is dried, the paint is put into an oven and baked at 120° C. to 180° C. for 5 to 15 minutes. The baked paint is then cooled to room temperature to form the primer coating. As such, the aqueous organic silicon fluoro-containing polymer dispersion, the curing agent, and the assist resin in the paint for the primer coating will react to form a product. Thereafter, the paint for the finish coating is coated on the primer coating. After the surface of the paint is dried, the paint is put into an oven and baked at 175° C. to 210° C. for 10 to 15 minutes. The baked paint is then cooled to room temperature to form the finish coating on the primer coating. As such, the aqueous organic silicon fluoro-containing polymer dispersion and the curing agent in the paint for the finish coating will react to form a product. The primer coating has a thickness of 10 μm to 15 μm, the finish coating layer has a thickness of 15 μm to 25 μm, and the coating has a total thickness of 25 μm to 40 μm.

When the assist resin is the aqueous polyester resin or the aqueous acrylic acid resin, the intermediate baking step can be omitted. For example, the paint for the primer coating can be coated on the substrate (chromium-treated metal plate). After an interval of 3 to 5 minutes, the paint for the finish coating is then coated thereon. The metal plate is then put into an oven, baked at 50° C. to 80° C. for 5 minutes, then heated to 175° C. to 210° C. and baked at 175° C. to 210° C. for 15 minutes, and then cooled to room temperature to form a baking-type aqueous organic silicon fluoro-containing polymer coating, in which the finish coating is formed on the primer coating. The primer coating has a thickness of 10 μm to 15 μm, the finish coating layer has a thickness of 15 μm to 25 μm, and the coating has a total thickness of 25 μm to 40 μm. An overly thin primer coating may reduce the adhesion between the coating and the substrate. The coating surface is easily bubbled during the baking due to an overly thick primer coating, thereby negatively influencing the coating appearance. An overly thin finish coating may reduce the physical and chemical properties of the coating. An overly thick finish coating may reduce the impact resistance of the coating, easily bubble during the baking, and increase the coating cost.

In one embodiment, the baking-type aqueous organic silicon fluorine-containing polymer coating includes not only the primer coating and the finish coating, but also a transparent mask on the finish coating to provide additional protection.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

The names and the sources of the chemicals in Examples are listed below.

The P(VDF-HFP) copolymers were fluoro rubbers F2601 with a VDF/HFP ratio of 80/20 and a solid content of 32%, F2611L with a HFP content of 20 wt % and a solid content of 28%, and F2631L with a HFP content of 50 wt % and a solid content of 30%, which were commercially available from Zhong Hao Chenguang Chemical Research Institute.

The organic silicon emulsions were aqueous methylphenyl organic silicon resin emulsion such as SILRES®MP 50 E with a solid content of 50% and SILRES®MPF 52 E with a solid content of 60% (commercially available from Wacker company), and SILIKOPHEN®P 40/W with a solid content of 50% (commercially available from German company Tego).

The coalescent agent was N-methyl-2-pyrrolidone (NMP).

The dispersing agent was DISPER BYK-190 commercially available from German company BYK.

The anti-foaming agent was the aqueous anti-foaming agent AS-022 commercially available from Taiwan An Fong Development Co Ltd.

The anti-corrosion agent was the zinc phosphate Z-Plex 111 commercially available from U.S. Company HALOX.

The wetting agent was Coatosil 1211 commercially available from U.S. Company Momentive.

The thickening agent was the non-ionic associative thickening agent Deurheo WT-108F commercially available from Elementis Deuchem.

The test plate was a chromizing surface aluminum plate (AL type) commercially available from U.S. Company Q-Panel.

Preparation Example 1 (Aqueous Organic Silicon Fluoro-Containing Polymer Dispersion WAFS-1)

3125 g of fluoro-containing polymer (F2601), 200 g of organic silicon emulsion (MP 50 E), 4 g of sodium lauryl sulfonate (SLS), and 1 g of sodium carbonate were added into a reactor and then evenly mixed. 0.8 g of AIBN, 6 g of HEMA, 17 g of MMA, 5 g of 2-EHA, 5 g of methacrylic acid (MAA), and 10 g of acrylamide (AM) were added into the stirred mixture in the reactor.

4 g of SLS, 1 g of sodium carbonate, 74 g of HEMA, 233 g of MMA, 65 g of 2-EHA, 10 g of MAA, and an appropriate amount of water were mixed to prepare a pre-emulsion in another vessel. 40 wt % of the pre-emulsion was dropwisely added into the stirred mixture at room temperature in the reactor. The mixture in the reactor was then heated to 60° C. and kept at 60° C. for 1 hour. The remaining pre-emulsion was then dropwisely added into the reactor in 30 minutes, and the reaction in the reactor was then heated to 75° C. and kept at 75° C. to react for 60 minutes. The reaction was then cooled to 60° C., 1 g of terminator (t-BPH/SFS) was then added to the reaction, and the termination reaction was kept at 60° C. for 1 hour. The reaction result was cooled to room temperature and then filtered to collect the filtrate, and the filtrate was an aqueous organic silicon fluoro-containing polymer dispersion.

Preparation Example 2 (Aqueous Organic Silicon Fluoro-Containing Polymer Dispersion WAFS-2)

3125 g of fluoro-containing polymer (F2601), 400 g of organic silicon emulsion (P 40/W), 6 g of SLS, and 1 g of sodium carbonate were added into a reactor and then evenly mixed. 0.7 g of AIBN, 5 g of HEMA, 13 g of MMA, and 10 g of AM were added into the stirred mixture in the reactor.

6 g of SLS, 1 g of sodium carbonate, 95 g of HEMA, 247 g of MMA, 10 g of MAA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and kept at 70° C. for 0.5 hour. The remaining pre-emulsion was then dropwisely added into the reactor in 60 minutes, and the reaction in the reactor was then heated to 80° C. and kept at 80° C. to react for 30 minutes. The reaction was then cooled to 70° C., 1 g of terminator (t-BPH/SFS) was then added to the reaction, and the termination reaction was kept at 70° C. for 2.5 hours. The reaction result was cooled to room temperature and then filtered to collect the filtrate, and the filtrate was an aqueous organic silicon fluoro-containing polymer dispersion.

Preparation Example 3 (Aqueous Organic Silicon Fluoro-Containing Polymer Dispersion WAFS-3)

3571.4 g of fluoro-containing polymer (F2611L), 500 g of organic silicon emulsion (MPF 52E), 5 g of SLS, and 1 g of sodium carbonate were added into a reactor and then evenly mixed. 0.8 g of AIBN, 5 g of HEMA, 13 g of MMA, 6 g of EA, and 5 g of AM were added into the stirred mixture in the reactor.

5 g of SLS, 1 g of sodium carbonate, 85 g of HEMA, 217 g of MMA, 94 g of EA, 10 g of AM, and an appropriate amount of water were mixed to prepare a pre-emulsion in another vessel, 50 wt % of the pre-emulsion was dropwisely added into the stirred mixture at room temperature in the reactor. The mixture in the reactor was then heated to 60° C. and kept at 60° C. for 1 hour. The remaining pre-emulsion was then dropwisely added into the reactor in 90 minutes, and the reaction in the reactor was then heated to 75° C. and kept at 75° C. to react for 60 minutes. The reaction was then cooled to 60° C., 1 g of terminator (t-BPH/SFS) was then added to the reaction, and the termination reaction was kept at 60° C. for 2.5 hours. The reaction result was cooled to room temperature and then filtered to collect the filtrate, and the filtrate was an aqueous organic silicon fluoro-containing polymer dispersion.

Preparation Example 4 (Aqueous Organic Silicon Fluoro-Containing Polymer Dispersion WAFS-4)

3333.3 g of fluoro-containing polymer (F2631L), 300 g of organic silicon emulsion (MPF 52E), 6 g of SLS, and 1 g of sodium carbonate were added into a reactor and then evenly mixed. 1 g of AIBN, 5 g of HEMA, 12 g of MMA, 5 g of MAA, and 3 g of 2-EHA were added into the stirred mixture in the reactor.

6 g of SLS, 1 g of sodium carbonate, 115 g of HEMA, 288 g of MMA, 77 g of 2-EHA, 20 g of MAA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and kept at 70° C. for 0.5 hour. The remaining pre-emulsion was then dropwisely added into the reactor in 60 minutes, and the reaction in the reactor was then heated to 80° C. and kept at 80° C. to react for 30 minutes. The reaction was then cooled to 70° C., 1 g of terminator (t-BPH/SFS) was then added to the reaction, and the termination reaction was kept at 70° C. for 1.5 hours. The reaction result was cooled to room temperature and then filtered to collect the filtrate, and the filtrate was an aqueous organic silicon fluoro-containing polymer dispersion.

Preparation Example 5 (Aqueous Organic Silicon Fluoro-Containing Polymer Dispersion WAFS-5)

3125 g of fluoro-containing polymer (F2601), 400 g of organic silicon emulsion (MPF 52E), 8 g of SLS, and 1 g of sodium carbonate were added into a reactor and then evenly mixed. 1.2 g of AIBN, 10 g of HEMA, 22 g of MMA, 8 g of EA, and 5 g of AM were added into the stirred mixture in the reactor.

8 g of SLS, 1 g of sodium carbonate, 140 g of HEMA, 328 g of MMA, 112 g of EA, 20 g of MAA, and an appropriate amount of water were mixed to prepare a pre-emulsion in another vessel. 50 wt % of the pre-emulsion was dropwisely added into the stirred mixture at room temperature in the reactor. The mixture in the reactor was then heated to 70° C. and kept at 70° C. for 1 hour. The remaining pre-emulsion was then dropwisely added into the reactor in 60 minutes, and the reaction in the reactor was then heated to 80° C. and kept at 80° C. to react for 40 minutes. The reaction was then cooled to 70° C., 1 g of terminator (t-BPH/SFS) was then added to the reaction, and the termination reaction was kept at 70° C. for 1 hour. The reaction result was cooled to room temperature and then filtered to collect the filtrate, and the filtrate was an aqueous organic silicon fluoro-containing polymer dispersion.

TABLE 1

|  |  | WAFS-1 | WAFS-2 | WAFS-3 | WAFS-4 | WAFS-5 |
|---|---|---|---|---|---|---|
| P(VDF-HFP), g | F2601 (solid content = 32%) | 3125 | 3125 | / | / | 3125 |
|  | F2611L (Solid content = 28%) | / | / | 3571.4 | / | / |
|  | P2631L (Solid content = 30%) | / | / | / | 3333.3 | / |

TABLE 1-continued

|  |  | WAFS-1 | WAFS-2 | WAFS-3 | WAFS-4 | WAFS-5 |
|---|---|---|---|---|---|---|
| Organic silicon emulsion (g) | MP 50 E (Solid content = 50%) | 200 | / | / | / | / |
|  | MPF 52 E Solid content = 60%) | / | / | 500 | 300 | 400 |
|  | P 40/W (Solid content = 50%) | / | 400 | / | / | / |
| Acrylate monomer (g) | HEMA | 80 | 100 | 90 | 120 | 150 |
|  | MMA | 250 | 260 | 230 | 300 | 350 |
|  | EA | / | / | 100 | / | 120 |
|  | 2-EHA | 70 | / | / | 80 | / |
| Functional monomer (g) | AM | 10 | 10 | 15 | / | 5 |
|  | MAA | 15 | 10 | / | 25 | 20 |
| Sodium lauryl sulfate (SLS, g) |  | 8 | 12 | 10 | 12 | 16 |
| Sodium carbonate (g) |  | 2 | 2 | 2 | 2 | 2 |
| AIBN (g) |  | 0.8 | 0.7 | 0.8 | 1 | 1.2 |
| Terminator (t-BPH/SFS, g) |  | 1 | 1 | 1 | 1 | 1 |

Example 1

Preparing a paint for a primer coating: 8 g of aqueous amino resin (CYMEL 303LF), 36 g of aqueous acrylic acid resin (ETERWAT 1611), 30 g of titanium oxide powder, 5 g of coalescent agent, 1 g of dispersing agent, 0.7 g of anti-foaming agent, 1.5 g of anti-corrosion agent, and appropriate amount of water were evenly mixed and ground for 2 hours. 100 g of the aqueous organic silicon fluoro-containing polymer dispersion WAFS-1, 25 g of water, and 1.6 g of thickening agent were evenly mixed with the above ground mixture, and then filtered by a filtering sieve of 300 mesh to collect the filtrate.

Preparing a paint for a finish coating: 4 g of aqueous amino resin (CYMEL 303LF), 22 g of titanium oxide powder, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-1, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 200° C. and baked for 15 minutes, and then cooled to room temperature to obtain a bi-layered coating.

Example 2

Preparing a paint for a primer coating: 8 g of aqueous isocyanate resin (WT-1000), 35 g of aqueous polyester resin (WP-536), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-2, 25 g of water, and 1.6 g of thickening agent were evenly mixed with the above ground mixture, and then filtered by a filtering sieve of 300 mesh to collect the filtrate.

Preparing a paint for a finish coating: 5 g of aqueous isocyanate resin (WT-1000), 22 g of titanium oxide powder, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-2, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 80° C. for 5 minutes, then heated to 175° C. and baked for 15 minutes, and then cooled to room temperature to obtain a bi-layered coating.

Example 3

Preparing a paint for a primer coating: 10 g of aqueous amino resin (CYMEL 1123), 30 g of aqueous epoxy resin (DER915), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-3, 25 g of water, and 1.6 g of thickening agent were evenly mixed with the above ground mixture, and then filtered by a filtering sieve of 300 mesh to collect the filtrate.

Preparing a paint for a finish coating: 6 g of aqueous amino resin (CYMEL 1123), 22 g of cobalt green, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-3, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After the surface of the paint was dried, the test plate was put into an oven and baked at 120° C. for 15 minutes, and then cooled to room temperature. The paint for the finish coating was sprayed on the primer coating. After the surface of the paint was dried, the test plate was put into an oven and baked at 175° C. for 15 minutes, and then cooled to room temperature to obtain a bi-layered coating.

Example 4

Preparing a paint for a primer coating: 6 g of aqueous amino resin (CYMEL 303LF), 40 g of aqueous acrylic acid resin (ETERWAT 1611), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-4, 25 g of water, and 1.6 g of thickening agent were evenly mixed with the above ground mixture, and then filtered by a filtering sieve of 300 mesh to collect the filtrate.

Preparing a paint for a finish coating: 4 g of aqueous amino resin (CYMEL 303LF), 22 g of titanium yellow, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-4, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 210° C. and baked for 15 minutes, and then cooled to room temperature to obtain a bi-layered coating.

Example 5

Preparing a paint for a primer coating: 8 g of aqueous amino resin (CYMEL 303LF), 40 g of aqueous phenoxy resin (PKHW-34), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-5, 25 g of water, and 1.6 g of thickening agent were evenly mixed with the above ground mixture, and then filtered by a filtering sieve of 300 mesh to collect the filtrate.

Preparing a paint for a finish coating: 5 g of aqueous amino resin (CYMEL 303LF), 22 g of cobalt blue, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-5, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After the surface of the paint was dried, the test plate was put into an oven and baked at 180° C. for 5 minutes, and then cooled to room temperature. The paint for the finish coating was sprayed on the primer coating. After the surface of the paint was dried, the test plate was put into an oven and baked at 210° C. for 10 minutes, and then cooled to room temperature to obtain a bi-layered coating.

TABLE 2

| | | Example 1 | | Example 2 | | Example 3 | |
|---|---|---|---|---|---|---|---|
| | | Paint for the primer coating | Paint for the finish coating | Paint for the primer coating | Paint for the finish coating | Paint for the primer coating | Paint for the finish coating |
| Dispersion | WAFS-1 | 100 | 100 | | | | |
| | WAFS-2 | | | 100 | 100 | | |
| | WAFS-3 | | | | | 100 | 100 |
| Curing agent | Aqueous amino resin CYMEL 303LF | 8 | 4 | | | | |
| | Aqueous amino resin CYMEL 1123 | | | | | 10 | 6 |
| | Aqueous isocyanate resin WT-1000 | | | 8 | 5 | | |
| Assist resin | Aqueous acrylic acid resin ETERWAT 1611 | 36 | | | | | |
| | Aqueous polyester resin WP-536 | | | 35 | | | |
| | Aqueous epoxy resin DER 915 | | | | | 30 | |
| | Aqueous phenoxy resin PKHW-34 | | | | | | |
| Water | De-ionized water | 25 | 25 | 25 | 25 | 25 | 25 |
| Auxiliary agent | Thickening agent | 1.6 | 1.5 | 1.6 | 1.5 | 1.6 | 1.5 |
| | Coalescent agent | 5 | 18 | 5 | 18 | 5 | 18 |
| | Dispersing agent | 1 | 0.6 | 1 | 0.6 | 1 | 0.6 |
| | Wetting agent | 0 | 0.8 | 0 | 0.8 | 0 | 0.8 |
| | Anti-foaming agent | 0.7 | 0.3 | 0.7 | 0.3 | 0.7 | 0.3 |
| | Anti-corrosion agent | 1.5 | 0 | 1.5 | 0 | 1.5 | 0 |
| Color powder | Titanium oxide | 30 | 22 | 30 | 22 | 30 | |
| | Cobalt green | | | | | | 22 |

TABLE 3

| | | Example 4 | | Example 5 | |
|---|---|---|---|---|---|
| | | Paint for the primer coating | Paint for the finish coating | Paint for the primer coating | Paint for the finish coating |
| Dispersion | WAFS-4 | 100 | 100 | | |
| | WAFS-5 | | | 100 | 100 |
| Curing agent | Aqueous amino resin CYMEL 303LF | 6 | 4 | 8 | 5 |
| | Aqueous amino resin CYMEL 1123 | | | | |
| | Aqueous isocyanate resin WT-1000 | | | | |
| Assist resin | Aqueous acrylic acid resin ETERWAT 1611 | 40 | | | |
| | Aqueous polyester resin WP-536 | | | | |
| | Aqueous epoxy resin DER 913 | | | | |
| | Aqueous phenoxy resin PKHW-34 | | | 40 | |
| Water | De-ionized water | 25 | 25 | 25 | 25 |
| Auxiliary agent | Thickening agent | 1.6 | 1.5 | 1.6 | 1.5 |
| | Coalescent agent | 5 | 18 | 5 | 18 |
| | Dispersing agent | 1 | 0.6 | 1 | 0.6 |
| | Wetting agent | 0 | 0.8 | 0 | 0.8 |
| | Anti-foaming agent | 0.7 | 0.3 | 0.7 | 0.3 |
| | Anti-corrosion agent | 1.5 | 0 | 1.5 | 0 |
| Color powder | Titanium oxide | 30 | | 30 | |
| | Titanium yellow | | 22 | | |
| | Cobalt blue | | | | 22 |

Comparative Example 1

Preparing a paint for a primer coating: the following compositions were ground for 2 hours to prepare an abrasive.

TABLE 4

| Abrasive composition | Composition weight (g) |
|---|---|
| Propylene glycol monomethyl ether acetate | 10 |
| Butyl acetate | 10 |
| Dimethyl phthalate | 20 |
| Ethylene glycol monobutylether | 10 |
| Dispersing agent | 1 |
| Epoxy resin (Epikote 1009) | 4 |
| Butyl acetate | 4 |
| Ti-Pure R-960 (Titanium oxide) | 80 |
| ZAP-X (Aluminum polyphosphate) | 16 |
| M-400 (Silica) | 15 |
| Total | 170 |

The following compositions were stirred by a high speed stirrer for 1 hour, then ground for 2 hours, and then filtered by a filtering sieve of 300 mesh to obtain a paint for a primer coating.

TABLE 5

| Composition | Weight (g) |
|---|---|
| Abrasive | 170 |
| Propylene glycol monomethyl ether acetate | 20 |
| Ethylene glycol monobutyl ether acetate | 20 |
| Dimethyl phthalate | 10 |
| Hylar-5000 (PVDF powder) | 36 |
| B-44 (Acrylic acid resin) | 14 |
| Toluene | 20 |
| Total | 290 |

Preparing a paint for a finish coating: 120 g of toluene, 1-g of acrylic acid resin (B-44), and 100 g of titanium oxide (Ti-Pure R-960) were ground for 2 hours to prepare an abrasive. The following compositions were stirred by a high speed stirrer for 1 hour, then ground for 2 hours, and then filtered by a filtering sieve of 300 mesh to obtain a paint for a finish coating.

TABLE 6

| Composition | Weight (g) |
|---|---|
| Abrasive | 230 |
| PMA (Propylene glycol monomethyl ether acetate) | 100 |
| EBA (Ethylene glycol monobutyl ether acetate) | 80 |
| DMP (Dimethyl phthalate) | 70 |
| Hylar-5000 (PVDF powder) | 175 |
| B-44 (Acrylic acid resin) | 60 |
| Toluene | 100 |
| Total | 815 |

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 240° C. and baked for 20 minutes, and then cooled to room temperature to obtain a bi-layered coating.

Comparative Example 2

Preparing a paint for a primer coating: 36 g of aqueous acrylic acid resin (ETERWAT 1611), 30 g of titanium oxide powder, 5 g of coalescent agent, 1 g of dispersing agent, 0.7 g of anti-foaming agent, and 1.5 g of anti-corrosion agent were evenly mixed and ground for 2 hours, 100 g of the aqueous organic silicon fluoro-containing polymer dispersion WAFS-1, 25 g of water, and 1.6 g of thickening agent were evenly mixed with the above ground mixture, and then filtered by a filtering sieve of 300 mesh to collect the filtrate.

Preparing a paint for a finish coating: 22 g of titanium oxide, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-1, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 200° C. and baked for 15 minutes, and then cooled to room temperature to obtain a bi-layered coating.

Comparative Example 3

Preparing a paint for a primer coating: 11 g of aqueous amino resin (CYMEL 303LF), 36 g of aqueous acrylic acid resin (ETERWAT 1611), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-1, 25 g of water, and 1.6 g of thickening agent were evenly mixed with the above ground mixture, and then filtered by a filtering sieve of 300 mesh to collect the filtrate.

Preparing a paint for a finish coating: 7 g of aqueous amino resin (CYMEL 303LF), 22 g of titanium oxide, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-1, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 200° C. and baked for 15 minutes, and then cooled to room temperature to obtain a bi-layered coating.

Comparative Example 4

Preparing a paint for a primer coating: 5 g of aqueous amino resin (CYMEL 303LF), 36 g of aqueous acrylic acid resin (ETERWAT 1611), 30 g of titanium oxide powder, 18 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-1, 25 g of water, and 1.6 g of thickening agent were evenly mixed with the above ground mixture, and then filtered by a filtering sieve of 300 mesh to collect the filtrate.

Preparing a paint for a finish coating: 3 g of aqueous amino resin (CYMEL 303LF), 22 g of titanium oxide, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-1, 25 g of water, and 1.5 g of thickening agent were evenly mixed with the above ground mixture, and then filtered by a filtering sieve of 300 mesh to collect the filtrate.

Preparing a coating: the paint for the primer coating was sprayed on the test plate. After an interval of 3 to 5 minutes, the paint for the finish coating was then sprayed thereon. The test plate was then put into an oven and baked at 50° C. for 5 minutes, then heated to 200° C. and baked for 15 minutes, and then cooled to room temperature to obtain a bi-layered coating.

Comparative Example 5

Preparing a paint for a primer coating: 8 g of aqueous amino resin (CYMEL 303LF), 36 g of aqueous acrylic acid resin (ETERWAT 1611), 30 g of titanium oxide powder, 5 g of coalescent agent, 1 g of dispersing agent, 0.7 g of anti-foaming agent, and 1.5 g of anti-corrosion agent were evenly mixed and ground for 2 hours. 100 g of the aqueous organic silicon fluoro-containing polymer dispersion WAFS-1, 25 g of water, and 1.6 g of thickening agent were evenly mixed with the above ground mixture, and then filtered by a filtering sieve of 300 mesh to collect the filtrate.

Preparing a coating: the paint for the primer coating was sprayed on the test plate. The test plate was then put into an oven and baked at 50° C. for 5 minutes, then heated to 200° C. and baked for 15 minutes, and then cooled to room temperature to obtain a single-layered coating.

Comparative Example 6

Preparing a paint for a finish coating: 4 g of aqueous amino resin (CYMEL 303LF), 22 g of titanium oxide, 18 g of coalescent agent, 0.6 g of dispersing agent, 0.8 g of wetting agent, and 0.3 g of anti-foaming agent were evenly mixed and ground for 2 hours. 100 g of the aqueous organic silicon fluoro-containing polymer dispersion WAFS-1, 25 g of water, and 1.5 g of thickening agent were evenly mixed with the above ground mixture, and then filtered by a filtering sieve of 300 mesh to collect the filtrate.

Preparing a coating: the paint for the finish coating was sprayed on the test plate. The test plate was then put into an oven and baked at 50° C. for 5 minutes, then heated to 200° C. and baked for 15 minutes, and then cooled to room temperature to obtain a single-layered coating.

TABLE 7

| | | Comparative Example 2 (No curing agent) | | Comparative Example 3 (Too much curing agent) | | Comparative Example 4 (Too little curing agent) | |
|---|---|---|---|---|---|---|---|
| | | Paint for the primer coating | Paint for the finish coating | Paint for the primer coating | Paint for the finish coating | Paint for the primer coating | Paint for the finish coating |
| Dispersion | WAFS-1 | 100 | 100 | 100 | 100 | 100 | 100 |
| Curing agent | Aqueous amino resin (CYMEL 303LF) | | | 11 | 7 | 5 | 3 |
| Assist resin | Aqueous acrylic acid resin (ETERWAT 1611) | 36 | / | 36 | / | 36 | / |
| Water | De-ionized water | 25 | 25 | 25 | 25 | 25 | 25 |
| Auxiliary agent | Thickening agent | 1.6 | 1.5 | 1.6 | 1.5 | 1.6 | 1.5 |
| | Coalescent agent | 5 | 18 | 5 | 18 | 5 | 18 |
| | Dispersing agent | 1 | 0.6 | 1 | 0.6 | 1 | 0.6 |
| | Wetting agent | 0 | 0.8 | 0 | 0.8 | 0 | 0.8 |
| | Anti-foaming agent | 0.7 | 0.3 | 0.7 | 0.3 | 0.7 | 0.3 |
| | Anti-corrosion | 1.5 | 0 | 1.5 | 0 | 1.5 | 0 |

TABLE 7-continued

|  |  | Comparative Example 2 (No curing agent) | | Comparative Example 3 (Too much curing agent) | | Comparative Example 4 (Too little curing agent) | |
| --- | --- | --- | --- | --- | --- | --- | --- |
|  |  | Paint for the primer coating | Paint for the finish coating | Paint for the primer coating | Paint for the finish coating | Paint for the primer coating | Paint for the finish coating |
|  | agent |  |  |  |  |  |  |
| Color powder | Titanium oxide | 30 | 22 | 30 | 22 | 30 | 22 |

TABLE 8

|  |  | Comparative Example 5 (Only the primer coating) Paint for the primer coating | Comparative Example 6 (Only the finish coating) Paint for the finish coating |
| --- | --- | --- | --- |
| Dispersion | WAFS-1 | 100 | 100 |
| Curing agent | Aqueous amino resin (CYMEL 303LF) | 8 | 4 |
| Assist resin | Aqueous acrylic acid resin (ETERWAT 1611) | 36 | / |
| Water | De-ionized water | 25 | 25 |
| Auxiliary agent | Thickening agent | 1.6 | 1.5 |
|  | Coalescent agent | 5 | 18 |
|  | Dispersing agent | 1 | 0.6 |
|  | Wetting agent | 0 | 0.8 |
|  | Anti-foaming agent | 0.7 | 0.3 |
|  | Anti-corrosion agent | 1.5 | 0 |
| Color powder | Titanium oxide | 30 | 22 |

The properties of the coating as tabulated in Tables 9 and 10 were measured according to the following standards. Brightness of the coatings was measured according to ASTM D523. Hardness of the coatings was measured according to American Society for Testing and Materials standard ASTM 13363. Salt mist resistance of the coatings was measured according to American Society for Testing and Materials standard ASTM B117. Climate resistance of the coatings was measured according to International standard International Organization for Standardization standard ISO 11507, in which the light source was UVB-313 and the method was 8.2.2 Method B. Acid resistance of the coatings was measured according to American Architectural Manufacturers Association standard AAMA_2605-05. Alkaline resistance of the coatings was measured according to American Architectural Manufacturers Association standard AAMA-2605-05 7.7.1. MEK resistance of the coatings was measured according to China national standard GB/T 23989-2009. Impact resistance of the coatings was measured according to American Architectural Manufacturers Association standard AAMA_2605-05. The adhesion between the test plate and the coating in dry state, wet state, and after being dipped in boiling water for 2 hours were measured according to American Architectural Manufacturers Association standard AAMA_2605-05 with a difference of the coating being further dipped in boiling water for 2 hours to measure the adhesion.

TABLE 9

| Properties | Example 1 | Example 2 | Example 3 | Example 4 | Example 5 | Comparative Example 1 |
| --- | --- | --- | --- | --- | --- | --- |
| Film thickness (μm) | 35-40 | 35-40 | 35-40 | 35-40 | 35-40 | 35-40 |
| Brightness (60°) | 50-60 | 25-30 | 25-30 | 50-60 | 30-40 | 30-35 |
| Hardness | 2H | 2H | 2H | 2H | 2H | 2H |
| Salt moist resistance (4000 hours) | No bubble, no rust | No bubble, no rust | No bubble, no rust | No bubble, no rust | No bubble, no rust | No bubble, no rust |
| Climate resistance, QUV test for 5000 hours | No bubble, no pulverization $\Delta E = 4.2$, $\Delta b = 3.7$ | No bubble, no pulverization $\Delta E = 4.2$, $\Delta b = 3.7$ | No bubble, no pulverization $\Delta E = 3.2$, $\Delta b = 3.0$ | No bubble, no pulverization $\Delta E = 4.9$, $\Delta b = 4.3$ | No bubble, no pulverization $\Delta E = 3.7$, $\Delta b = 3.4$ | No bubble, no pulverization $\Delta E = 3.3$, $\Delta b = 3.0$ |
| Acid resistance, 37% HCl for 15 minutes | No bubble | No bubble | No bubble | No bubble | No bubble | No bubble |
| Alkaline resistance, 5% NaOH for 24 hours | No bubble | No bubble | No bubble | No bubble | No bubble | No bubble |
| MEK resistance | Test plate is not exposed after MEK scratching back and forth 100 times | Test plate is not exposed after MEK scratching back and forth 100 times | Test plate is not exposed after MEK scratching back and forth 100 times | Test plate is not exposed after MEK scratching back and forth 100 times | Test plate is not exposed after MEK scratching back and forth 100 times | Test plate is not exposed after MEK scratching back and forth 100 times |

TABLE 9-continued

| Properties | | Example 1 | Example 2 | Example 3 | Example 4 | Example 5 | Comparative Example 1 |
|---|---|---|---|---|---|---|---|
| Impact resistance | | No crack | No crack | No crack | No crack | No crack | No crack |
| Adhesion | Dry state | 100/100 | 100/100 | 100/100 | 100/100 | 100/100 | 100/100 |
| | Wet state | 100/100 | 100/100 | 100/100 | 100/100 | 100/100 | 100/100 |
| | After being dipped in boiling water for 2 hours | 100/100 | 100/100 | 100/100 | 100/100 | 100/100 | 100/100 |

TABLE 10

| Properties | | Comparative Example 2 | Comparative Example 3 | Comparative Example 4 | Comparative Example 5 | Comparative Example 6 |
|---|---|---|---|---|---|---|
| Film thickness (μm) | | 35-40 | 35-40 | 35-40 | 20-25 | 25-30 |
| Brightness (60°) | | 50-60 | 50-60 | 50-60 | 60-70 | 35-45 |
| Hardness | | H | 2H | 2H | H | 2H |
| Salt moist resistance (4000 hours) | | Bubble, no rust | Bubble, no rust | Slight bubble, no rust | Bubble, no rust | Bubble, no rust |
| Climate resistance, QUV test for 5000 hours | | Bubble, pulverization $\Delta E = —, \Delta b = —$ | No bubble, no pulverization $\Delta E = 8.0, \Delta b = 7.2$ | Slight bubble, no pulverization $\Delta E = 4.2, \Delta b = 3.7$ | Bubble, pulverization $\Delta E = —, \Delta b = —$ | Bubble, no pulverization $\Delta E = 5.1, \Delta b = 3.0$ |
| Acid resistance, 37% HCl for 15 minutes | | Bubble | No bubble | Slight bubble | Bubble | No bubble |
| Alkaline resistance, 5% NaOH for 24 hours | | Bubble | No bubble | Bubble | Bubble | No bubble |
| MEK scratch resistance | | Test plate is exposed after MEK scratching back and forth 10 times | Test plate is not exposed after MEK scratching back and forth 100 times | Test plate is exposed after MEK scratching back and forth 50 times | Test plate is exposed after MEK scratching back and forth 50 times | Test plate is exposed after MEK scratching back and forth 90 times |
| Impact resistance | | No crack | Crack | No crack | No crack | No crack |
| Adhesion | Dry state | 100/100 | 100/100 | 100/100 | 100/100 | 30/100 |
| | Wet state | 0/100 | 100/100 | 100/100 | 50/100 | 0/100 |
| | After being dipped in boiling water for 2 hours | 0/100 | 100/100 | 80/100 | 0/100 | 0/100 |

As shown in Tables 9 and 10, the baking-type aqueous organic silicon fluoro-containing polymer paint in the disclosure could form a coating with excellent salt mist resistance, climate resistance, acid resistance, alkaline resistance, MEK resistance, impact resistance, and adhesion. Compared to the Comparative Examples, the baking-type aqueous organic silicon fluoro-containing polymer paint achieved the same level of performance as the conventional solvent-based PVDF paint. In other words, the solvent-based PVDF paint can be replaced with the baking-type aqueous organic silicon fluoro-containing polymer paint in the disclosure.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A baking-type aqueous organic silicon fluorine-containing polymer paint, comprising:
    an aqueous organic silicon fluorine-containing polymer dispersion; and a curing agent including an aqueous amino resin, an aqueous isocyanate resin, or a combination thereof, wherein the aqueous organic silicon fluoro-containing polymer dispersion includes:
100 parts by weight of a poly(vinylidene difluoride-hexafluoropropylene), wherein the poly(vinylidene difluoride-hexafluoropropylene) has a hexafluoropropylene content of 20 wt % to 50 wt %;
10 to 30 parts by weight of an organic silicon emulsion; and
an acrylate polymer, wherein the acrylate polymer and the sum of the poly(vinylidene difluoride-hexafluoropropylene) and the organic silicon emulsion have a weight ratio of 30:100 to 50:100,
wherein the organic silicon emulsion is methylphenyl organic silicon resin emulsion.

2. The baking-type aqueous organic silicon fluorine-containing polymer paint as claimed in claim 1, wherein the aqueous organic silicon fluorine-containing polymer dispersion and the curing agent have a weight ratio of 100:4 to 100:6.

3. The baking-type aqueous organic silicon fluorine-containing polymer paint as claimed in claim 1, further comprising:
an assist resin, including an aqueous polyester resin, an aqueous acrylic acid resin, an aqueous epoxy resin, an aqueous phenoxy resin, or a combination thereof,
wherein the aqueous organic silicon fluorine-containing polymer dispersion and the curing agent have a weight ratio of 100:6 to 100:10, and the aqueous organic silicon fluorine-containing polymer dispersion and the assist resin have a weight ratio of 100:30 to 100:40.

4. The baking-type aqueous organic silicon fluorine-containing polymer paint as claimed in claim 1, wherein the acrylate polymer is polymerized from a monomer mixture of hydroxyethyl methacrylate and methyl methacrylate ethyl acrylate, butyl acrylate, butyl methacrylate, 2-ethylhexyl acrylate, hydroxypropyl acrylate, hydroxyethyl acrylate, or a combination thereof.

5. The baking-type aqueous organic silicon fluorine-containing polymer paint as claimed in claim 4, wherein the acrylate polymer is further polymerized from 1 to 10 parts by weight of functional monomer, and the functional monomer includes methacrylic acid, N-(hydroxymethyl)acrylamide, acrylic acid, acrylamide, glycidyl methacrylate, vinyl trimethoxy silane, methyl vinyl dimethoxy silane, vinyl triethoxy silane, (3-methacryloxy)propyl triethoxy silane, (methacryloxymethyl)methyl dimethoxy silane, methacryloxymethyl trimethoxy silane, diacetoneacrylamide, isobornyl acrylate, or a combination thereof.

6. A baking-type aqueous organic silicon fluorine-containing polymer coating, comprising:
a primer coating; and
a finish coating on the primer coating,
wherein the primer coating includes:
a reaction product of a first aqueous organic silicon fluorine-containing polymer dispersion, a first curing agent, and an assist resin,
wherein the first curing agent includes an aqueous amino resin, an aqueous isocyanate resin, or a combination thereof,
wherein the assist resin includes an aqueous polyester resin, an aqueous acrylic acid resin, an aqueous epoxy resin, an aqueous phenoxy resin, or a combination thereof, and
wherein the first aqueous organic silicon fluorine-containing polymer dispersion and the first curing agent have a weight ratio of 100:6 to 100:10, and the first aqueous organic silicon fluorine-containing polymer dispersion and the assist resin have a weight ratio of 100:30 to 100:40,
wherein the finish coating includes:
a reaction product of a second aqueous organic silicon fluorine-containing polymer dispersion and a second curing agent,
wherein the second curing agent includes an aqueous amino resin, an aqueous isocyanate resin, or a combination thereof, and
wherein the second aqueous organic silicon fluorine-containing polymer dispersion and the second curing agent have a weight ratio of 100:4 to 100:6,
wherein each of the first and second aqueous organic silicon fluoro-containing polymer dispersion includes:
100 parts by weight of a poly(vinylidene difluoride-hexafluoropropylene), wherein the poly(vinylidene difluoride-hexafluoropropylene) has a hexafluoropropylene content of 20 wt % to 50 wt %;
10 to 30 parts by weight of an organic silicon emulsion; and
an acrylate polymer, wherein the acrylate polymer and the sum of the poly(vinylidene difluoride-hexafluoropropylene) and the organic silicon emulsion have a weight ratio of 30:100 to 50:100,
wherein the organic silicon emulsion is methylphenyl organic silicon resin emulsion.

7. The baking-type aqueous organic silicon fluorine-containing polymer coating as claimed in claim 6, wherein the acrylate polymer is polymerized from a monomer mixture of hydroxyethyl methacrylate and methyl methacrylate ethyl acrylate, butyl acrylate, butyl methacrylate, 2-ethylhexyl acrylate, hydroxypropyl acrylate, hydroxyethyl acrylate, or a combination thereof.

8. The baking-type aqueous organic silicon fluorine-containing polymer coating as claimed in claim 7, wherein the acrylate polymer is further polymerized from 1 to 10 parts by weight of functional monomer, and the functional monomer includes methacrylic acid, N-(hydroxymethyl)acrylamide, acrylic acid, acrylamide, glycidyl methacrylate, vinyl trimethoxy silane, methyl vinyl dimethoxy silane, vinyl triethoxy silane, (3-methacryloxy)propyl triethoxy silane, (methacryloxymethyl)methyl dimethoxy silane, methacryloxymethyl trimethoxy silane, diacetoneacrylamide, isobornyl acrylate, or a combination thereof.

9. The baking-type aqueous organic silicon fluorine-containing polymer coating as claimed in claim 6, wherein the primer coating has a thickness of 10 µm to 15 µm, and the finish coating has a thickness of 15 µm to 25 µm.

* * * * *